Oct. 30, 1956  G. J. FABIAN  2,768,698
STEERABLE DRIVE AXLE CONSTRUCTION
Filed May 26, 1954  2 Sheets-Sheet 1
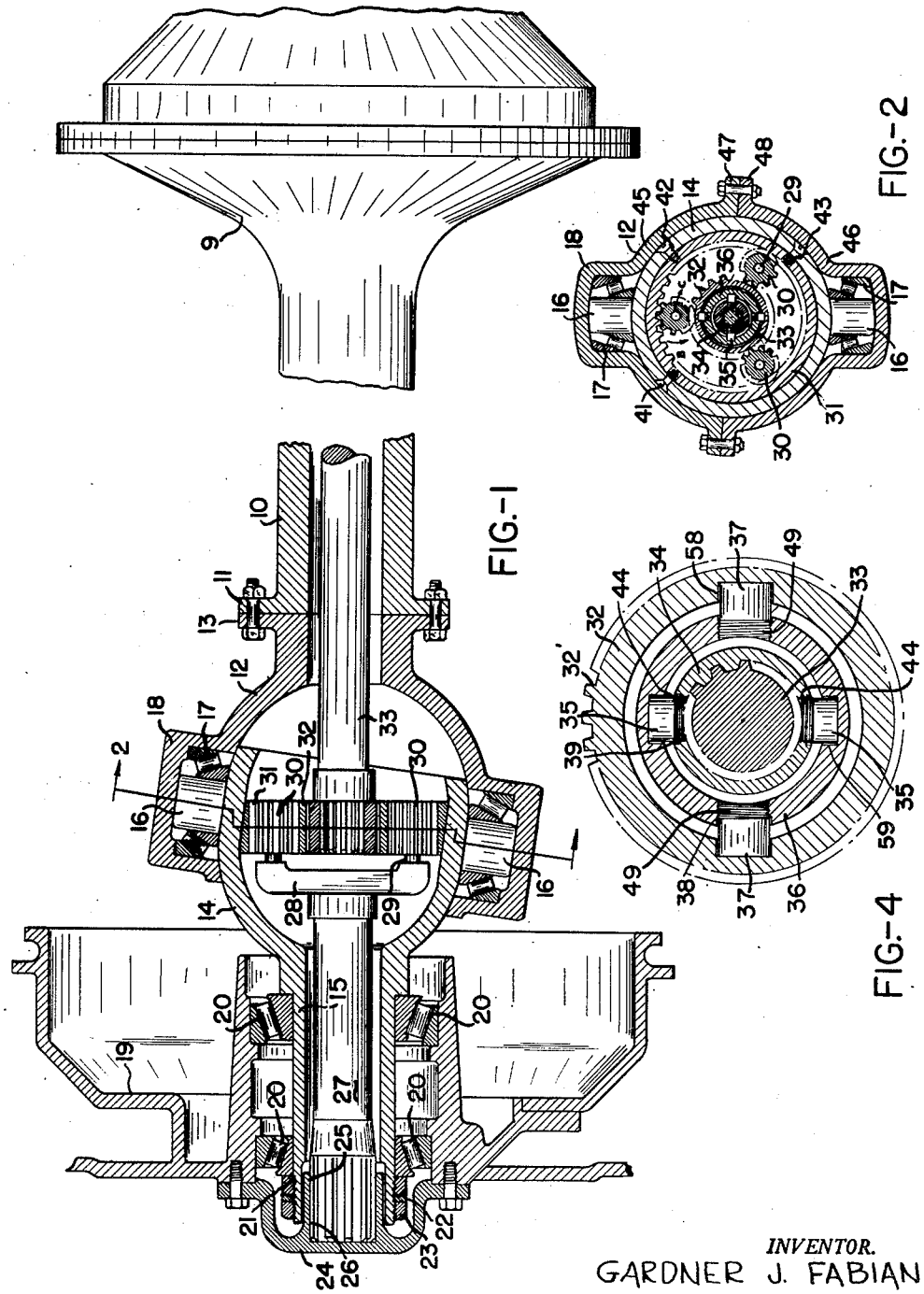
INVENTOR.
GARDNER J. FABIAN
BY
Wheeler, Wheeler & Wheeler
ATTORNEYS Oct. 30, 1956 G. J. FABIAN 2,768,698
STEERABLE DRIVE AXLE CONSTRUCTION
Filed May 26, 1954 2 Sheets-Sheet 2
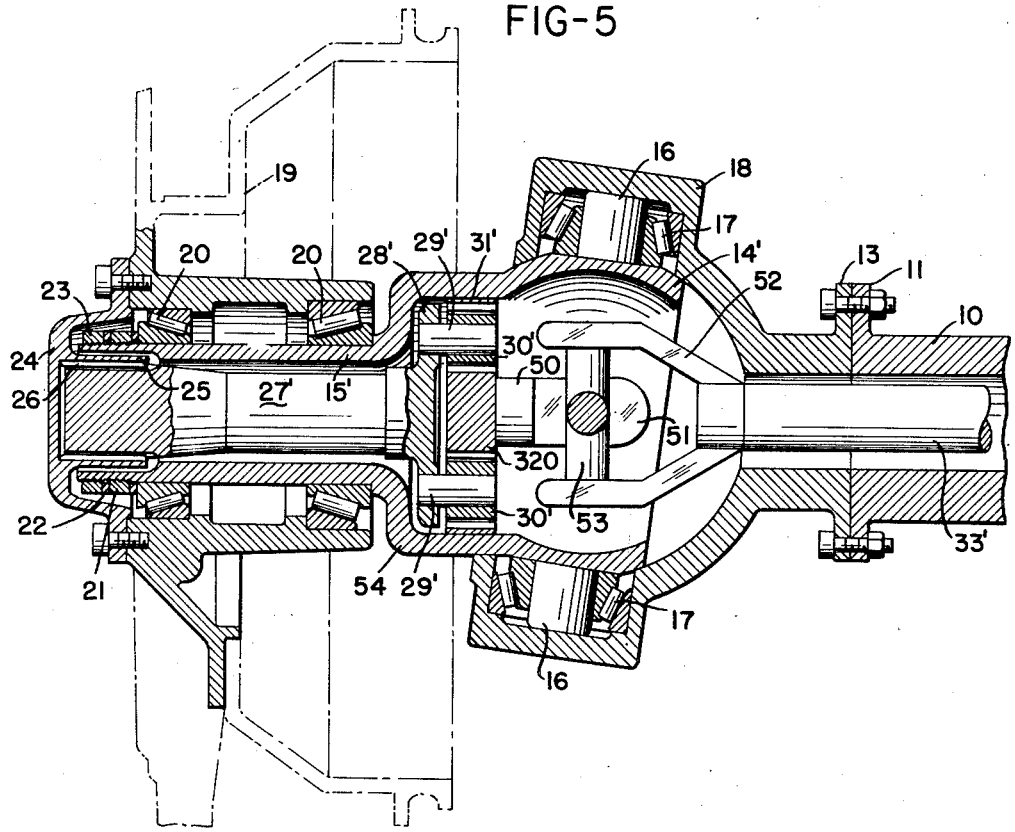
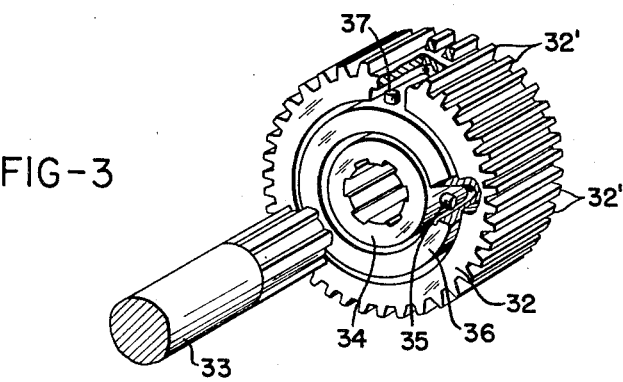
INVENTOR.
GARDNER J. FABIAN
BY
Wheeler, Wheeler & Wheeler
ATTORNEYS

United States Patent Office 2,768,698
Patented Oct. 30, 1956

2,768,698

STEERABLE DRIVE AXLE CONSTRUCTION

Gardner J. Fabian, Clintonville, Wis., assignor to The Four Wheel Drive Auto Company, Clintonville, Wis., a corporation of Wisconsin Application May 26, 1954, Serial No. 432,463

1 Claim. (Cl. 180—43)

This invention relates to a steerable drive axle construction and more particularly to a novel means and method for increasing axle driving torque within the steering joint thereof.

Vehicles having power transmitted to steerable wheels conventionally have a stationary axle housing with steering joints disposed at the ends thereof. Skeins which provide a bearing surface upon which the wheels may rotate are attached to these steering joints for horizontal oscillation thereabout. To provide driving power to the wheel an axle shaft extends through the axle housing to a drive flange on the wheel. This shaft is provided with a universal joint intermediate its ends, the pivot point of which is on the axis of oscillation of the wheel steering joint.

Many times in actual practice the axles which convey power to these steerable wheels are not of sufficient diameter to withstand the stress of extremely large loads or abnormal shock. To provide larger driving axle shafts would require a larger axle housing and many new parts particularly in the differential mechanism at a consequent addition to the vehicle weight and cost. A housing required for a larger differential would also seriously reduce the clearance between the vehicle and the ground. A substantial clearance is particularly important in heavy duty trucks intended for off the road service because of the obstructions and uneven ground encountered thereby and is consequently made as great as is mechanically feasible.

The method taught herein which provides the required additional wheel torque without a corresponding increase in axle housing size or the addition of new parts comprises the replacing of the standard universal joint ordinarily disposed in the steering joint of front wheel drive vehicles with a planetary gear set by anchoring the ring gear thereof to the inner surface of the steering ball, universally connecting a sun gear to the steering joint end of the driving axle shaft and attaching a planet carrier to the steering joint end of the stub shaft, said carrier having planet gears meshing with said sun and ring gears.

The novel structure herein comprises a planetary gear set within the steering joint of the steerable drive wheel. The ring gear of said set is rigidly fastened to the inner periphery of the steering joint of the stub shaft and the sun gear is universally attached to the driving axle shaft. In operation the driving axle shaft drives the sun gear thereby causing rotation of the planet gears and rotating the stub shaft through the planet gear carrier. This gearing effectively produces an increase in the driving torque transmitted to the wheel.

An important object of this invention is to provide a novel, simple and inexpensive means of increasing the torque at a steerable drive axle without a corresponding increase in the axle and differential housing size.

Another important object of the present invention is the provision for installing the unit in a vehicle in the field with only common maintenance tools, such as those usually supplied with said vehicles.

Other objects of this invention will appear in the following description and appended claim, it being understood that changes may be made in the construction and arrangement of the parts without departing from the spirit of the invention as claimed.

In the drawings:

Figure 1 is a view in vertical section of a steering joint in a driving axle embodying my invention.

Figure 2 is a view of the steering joint taken in cross section substantially on line 2—2 of Figure 1.

Figure 3 is a fragmentary detail view in perspective on enlarged scale showing the mounting of the sun gear to the driving axle shaft of Figure 1.

Figure 4 is an enlarged section of the gimbal ring taken on line 2—2 of Figure 1 showing the method of assembly of said ring.

Figure 5 is a view in vertical section of a second embodiment of my invention.

Referring to the drawings, the axle construction of the present invention comprises an axle housing 10 which terminates at each end in parting flange 11. Steering joint socket 12 has a complementary flange 13 which is detachably secured to the flange 11, thus forming in effect a continuation of the housing 10. It is to be understood that the housing 10 extends to and provides a covering for the differential 9 which in turn connects with the gear train for transmitting power from the power drive shaft (not shown) to the axle drive shaft.

A steering joint ball 14 is formed at the inner end of skein 15 such that it fits into socket 12, said socket comprising an upper half 45 and a lower half 46 said halves being jointed by fastening means through parting flanges 47 and 48 respectively. Said ball 14 is supported in socket 12 by trunnions 16 which are formed integrally with ball 14. These trunnions 16 extend into and are held by bearings 17 which are in turn encased in socket caps 18. It can, therefore, be seen that skein 15 can oscillate back and forth with the centerline through trunnions 16 as an axis of oscillation.

Wheel 19 is supported for rotation relative to skein 15 by adjustable bearings 20. The wheel 19 is adjusted for rotation on the bearings 20 by the bearing adjusting nut 21, which is screw threaded on the end of skein 15 and held in adjusted position by washer 22 and lock nut 23.

Wheel hub cap 24 is detachably mounted to wheel 19 and is provided with an inwardly extending sleeve 25, having internal splines 26 which engage complementary splines upon stub shaft 27 for integral rotation therewith.

Stub shaft 27 is splined at its outer end so as to engage splines 26 and has its inner end keyed to planet gear carrier 28. Shafts 29 extend inwardly from said carrier and support a plurality of planet gears 30. The planet gears 30 are of the spur type and mesh with stationary ring gear 31 and sun gear 32. The said ring gear may be integral with ball 14 and may be permanently or detachably mounted therein. A detachable mounting, such as the screws 41, 42 and 43, is preferred over splines or pins.

Sun gear 32 is universally mounted to the driving axle shaft 33 by the pivoted gimbal ring arrangement shown in Figure 3. Ring 34 is splined or keyed to shaft 33 and has two pins 35 projecting from its outer surface and spaced 180° apart. A gimbal ring 36 of larger diameter than ring 34 and concentric therewith is provided with sockets on its inner surface engaged by the said pins. A second pair of pins 37 which are offset 90° from the first pins extend from the outer surface of ring 36. Sun gear 32, with teeth 32' on its outer periphery is concentric with gimbal ring 36 and has sockets to receive pins 37 and hold gimbal ring 36 in place.

Figure 4 shows the preferred manner of gimbal ring assembly. Pins 37 are inserted into sockets 58 in sun gear 32 through holes 38 in gimbal ring 36. These pins are held in place by threaded plugs 49 substantially as shown. Internally splined ring 34 has holes 39 through which pins 35 are inserted into the gimbal ring sockets 59 provided therefor. Threaded plugs 44 hold said pins in place and may also be used for the adjustment thereof. Driving shaft 33 is provided with splines to engage the internal splines of ring 34 thus assembly of the said splined members effects a sun gear universally mounted to a driveshaft for the transmission of power. The splined connection between shaft 33 and ring 34 is preferred but it is understood that many other methods of attachment are possible.

The operation of the improved driving axle is as follows:

To cause the vehicle to move forward, the axle drive shaft 33 is rotated in a clockwise direction (in Fig. 2) and at higher speed than if the drive were direct thus giving a similar motion to the sun gear 32. Gear 32 then transmits a counterclockwise motion B to plant gears 30 which rotate on shafts 29. Since the ring gear 31 is stationary its teeth serve as reaction points for the planet gears and a clockwise rotation C is thus imparted to the planet carrier 28. Since shaft 27, carrier 28 and hub 24 are unitarily mounted, the clockwise rotation of said carrier is transmitted to wheel 19 with lower speed but greater torque being delivered than was originally carried by shaft 33. This is due to the torque increase provided by the planetary gear set in the steering joint.

The wheel 19 may be oscillated about the axis of trunnions 16 while power is being transmitted to the wheel 19 through shafts 27 and 33 because of the universal sun gear mounting. The inclination of the axis of trunnions 16 is exempting only as it is understood that the axis of trunnion oscillation may be vertical or inclined within the scope of my invention.

A second embodiment of my invention is shown in Figure 5. Herein another type of universally mounted sun gear is used.

A wheel skein 15' has a ball 14' integral therewith and also has an enlarged annular portion 54 having an internally toothed ring gear 31' therein which is either integral or detachably mounted. A planet carrier 28' is keyed for rotation with a wheel connected stub shaft 27', the stub shaft aforesaid being the driven shaft of the wheel 19. Planet gears 30' are held for rotation on shafts 29' which are in turn rigidly held in carrier 28'. Sun gear 320 is rigidly mounted to universal joint shaft 50, said shaft having a universal joint yoke 51 which is also keyed or splined to shaft 50. Driving shaft 33' also has a universal joint yoke 52 unitarily mounted thereon and spider 53 is connected between said yokes to form a Hooke type universal joint, the pivot point of which is substantially on a centerline through trunnions 16. Thus the planetary gearing is retained in the steering joint housing of the wheel, the only replacement parts necessary in the conversion from a standard axle to a high torque axle being the skein 15', stub shaft 27' with planet gears 30' and a universal joint shaft 50 with sun gear 320 mounted thereon. The said conversion can easily be accomplished with simple hand tools using any jacking means to elevate the vehicle.

The Hooke type universal joint aforesaid may be replaced by any other joint for transmitting motion angularly from a driving shaft such as constant velocity joints of the Rzeppa or Bendix Weiss type.

I claim:

In a reduction drive universal designed for substitution for a conventional universal between the drive shaft and the stub shaft within the steering joint of a vehicle axle, the combination with a mounting ring and means for connecting the mounting ring to the driving shaft, of an annular sun gear encircling the mounting ring, and an intervening gimbal ring having pairs of oppositely extending trunnions with their axes disposed at a right angle, said trunnions being respectively engaged with the mounting ring and the sun gear whereby to mount the sun gear for universal movement about the mounting ring, a planet gear carrier having means for connecting it with the stub shaft for rotation therewith, said carrier being provided with pinions meshing with the sun gear, a ring gear with which such pinions also mesh and means for anchoring the ring gear within the steering joint.

References Cited in the file of this patent

UNITED STATES PATENTS

| 846,754 | McClintock | Mar. 12, 1907 |
| 1,214,151 | Greer et al. | Jan. 30, 1917 |
| 1,978,300 | Ferguson et al. | Oct. 23, 1934 |
| 2,132,545 | Smith | Oct. 11, 1938 |

FOREIGN PATENTS

| 973,268 | France | Sept. 13, 1950 |
| 165,162 | Great Britain | June 17, 1921 |